US006820169B2

(12) United States Patent
Wilcox et al.

(10) Patent No.: US 6,820,169 B2
(45) Date of Patent: Nov. 16, 2004

(54) MEMORY CONTROL WITH LOOKAHEAD POWER MANAGEMENT

(75) Inventors: Jeffrey R. Wilcox, Hudson, OH (US); Opher D. Kahn, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 09/963,002

(22) Filed: Sep. 25, 2001

(65) Prior Publication Data

US 2003/0061458 A1 Mar. 27, 2003

(51) Int. Cl.[7] ............................................. G06F 12/00
(52) U.S. Cl. ...................... 711/105; 711/111; 711/112; 713/300; 713/320; 713/322; 713/323
(58) Field of Search ................ 711/105, 111, 711/112, 106, 118, 167; 713/300, 320, 322, 323; 710/15, 18; 365/226, 227, 228, 229

(56) References Cited

U.S. PATENT DOCUMENTS

| | | | | | |
|---|---|---|---|---|---|
| 5,390,334 | A | * | 2/1995 | Harrison | 713/324 |
| 5,826,045 | A | * | 10/1998 | Reams | 710/107 |
| 6,038,673 | A | * | 3/2000 | Benn et al. | 713/323 |
| 6,212,611 | B1 | | 4/2001 | Nizar et al. | |
| 6,292,856 | B1 | * | 9/2001 | Marcotte | 710/39 |
| 6,330,639 | B1 | * | 12/2001 | Fanning et al. | 711/106 |
| 6,425,044 | B1 | * | 7/2002 | Jeddeloh | 711/5 |
| 6,442,698 | B2 | * | 8/2002 | Nizar | 713/320 |
| 6,523,089 | B2 | * | 2/2003 | Tsern et al. | 711/118 |
| 6,636,957 | B2 | * | 10/2003 | Stevens et al. | 711/171 |
| 6,671,815 | B2 | * | 12/2003 | Iwamura et al. | 713/324 |

OTHER PUBLICATIONS

Intel Corporation; Intel 815 Chipset Family: 82815EP and 82815P Memory Controller Hub (MCH); Mar. 2001; 137 pages; ftp://download.intel.com/design/chipsets/datashts/29069302.pdf.
Micron Technology, Inc., Double Data Rate (DDR) SDRAM MT46V2M32—512K×32×4 banks; Rev. 03/01; 64 pages; http://images.micron.com/pdf/datasheets/dram/2M32DDR–07.pdf.
Electronics Industries Alliance Jedec Solid State Technology Association; Double Data Rate (DDR) SDRAM Specification; JEDEC Standard No. 79; Jun. 2000; 77 pages; http://www.jedec.org/DOWNLOAD/jdec/JESD79R1.pdf.
Rambus Incorporated; Direct RDRAM 128/144–Mbit (256× 16/18×32s); Document DL0059; Version 1.11; 66 pages; http://www.rambus.com/developer/downloads/rdram.128s0059–1.11.book.pdf.

* cited by examiner

Primary Examiner—Donald Sparks
Assistant Examiner—Ngoc V Dinh
(74) Attorney, Agent, or Firm—Blakely, Sokoloff, Taylor & Zafman LLP (57) ABSTRACT

One or more memory requests are stored in a request buffer. Each memory request targets a memory device in a memory system having one or more memory devices. Each memory device has a first power state and a second power state. Each memory request is issued in an order from the request buffer to the memory system. The memory device targeted by one memory request from the request buffer is identified prior to or while another memory request ahead of the one memory request is issued to the memory system and performed by the memory system. The identified memory device is placed or maintained in the second power state prior to issuing the one memory request to the memory system.

20 Claims, 7 Drawing Sheets

| | FIRST CLOCK CYCLE | SECOND CLOCK CYCLE | THIRD CLOCK CYCLE | FOURTH CLOCK CYCLE | FIFTH CLOCK CYCLE |
|---|---|---|---|---|---|
| REQUEST STAGE | FIRST REQUEST | SECOND REQUEST | | | |
| DECODE STAGE | | FIRST REQUEST | SECOND REQUEST | | |
| SCHEDULING STAGE | | | FIRST REQUEST | SECOND REQUEST | |
| ISSUE STAGE | | | | FIRST REQUEST | SECOND REQUEST |
| CLOCK_ENABLE SET 1 | LOW | LOW | HIGH | HIGH | LOW |
| CLOCK_ENABLE SET 2 | LOW | LOW | LOW | HIGH | HIGH |

MEMORY CONTROL WITH LOOKAHEAD POWER MANAGEMENT

FIELD OF THE INVENTION

The present invention relates to the field of computer systems. More particularly, the present invention relates to the field of memory control for computer systems.

BACKGROUND

The performance of a typical computer system is dependent on memory bandwidth, the speed at which a processor can access memory. One common type of memory used in computer systems is synchronous dynamic random access memory (SDRAM), which is often configured as sets of individual components packaged in dual inline memory modules (DIMMs) that plug into computer motherboards. The speed of SDRAM has increased dramatically, particularly with the development of double data rate (DDR) SDRAM. As the name implies, DDR SDRAMs effectively double memory bandwidth by exchanging data on rising and falling edges of the same clock signal. Unfortunately, the increase in speed has been accompanied by an increase in power consumption.

In an effort to reduce power consumption, some computer systems that use DDR SDRAM devices place the devices into low power states when the devices are not in use. Typically, a set of SDRAM devices, whether single or double data rate, is placed into a low power state by de-asserting the clock enable (CKE) signal for the set of devices. In one method, to take advantage of these low power states, the CKE signal for a given set of SDRAM devices is de-asserted when the set is not being accessed, and asserted when the set is being accessed.

Placing SDRAM devices in low power states, however, decreases memory bandwidth due to an increase in memory system latency. The increase in latency is caused by a delay of one or more clock cycles required by SDRAM devices after the low power state is exited before a valid memory request may be issued to the device. The delay is required to ensure the SDRAM device has achieved a stable condition after powering up, prior to accepting a memory request.

Thus, every time a set of SDRAM devices is powered down, the system incurs a latency penalty of one or more clock cycles. For systems that frequently power down devices in an effort to reduce power consumption, the cumulative effect of these latency periods can degrade system performance substantially. This negative effect on performance increases if memory requests frequently target devices that have been powered down just recently so that the latency periods account for a higher percentage of the access time.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The following detailed description sets forth an embodiment or embodiments in accordance with the present invention for memory control with lookahead power management.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

An Exemplary Computer System

Figure 1:
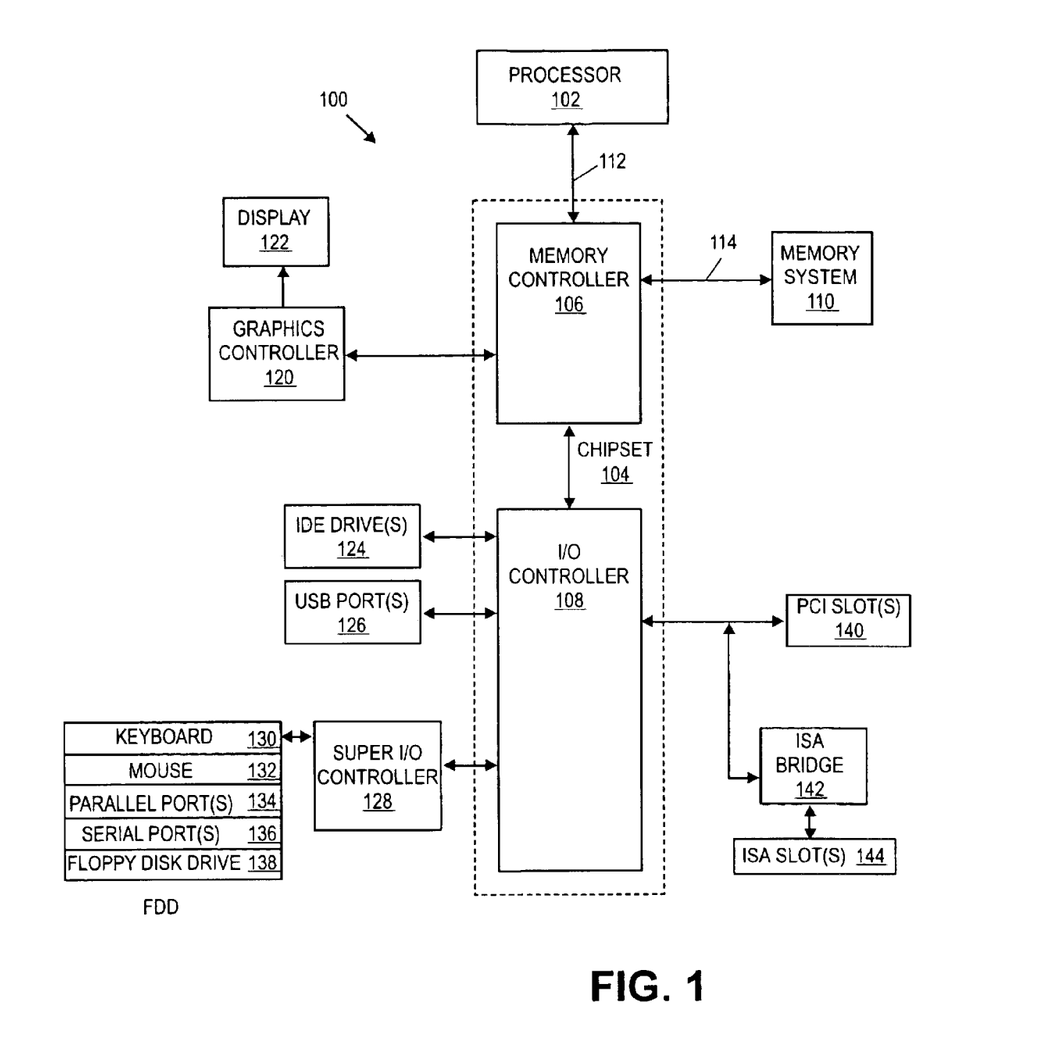
FIG. 1 illustrates, for one embodiment, an exemplary computer system to perform memory control with lookahead power management.

FIG. 1 illustrates an exemplary computer system 100 to perform memory control with lookahead power management. Although described in the context of computer system 100, the present invention may be implemented in any suitable computer system comprising any suitable one or more integrated circuits.

As illustrated in FIG. 1, computer system 100 comprises a processor 102, a chipset 104, and a processor bus 112. Processor 102 and chipset 104 are coupled to processor bus 112. Processor 102 may comprise any suitable processor such as, for example, a processor in the Pentium® or Celeron® family of processors available from Intel® Corporation of Santa Clara, Calif. For other embodiments, computer system 100 may comprise two or more processors.

Chipset 104, for one embodiment, comprises a memory controller 106 and an input/output controller (IOC) 108. Memory controller 106 and IOC 108 may each comprise any suitable circuitry and, for one embodiment, are each formed as a separate integrated circuit chip. Chipset 104, for other embodiments, may comprise any suitable one or more integrated circuit devices.

Memory controller 106 may comprise any suitable interface controllers to provide for any suitable communication link to processor bus 112 and/or to any suitable device or component in communication with memory controller 106. Memory controller 106, for one embodiment, provides suitable arbitration, buffering, and coherency management for each interface.

Memory controller 106 is coupled to processor bus 112 and provides an interface to processor 102 over processor bus 112. Processor 102 may alternatively be combined with memory controller 106 to form a single chip. Memory controller 106, for one embodiment, also provides an interface to a memory system 110 and a graphics controller 120 each of which are coupled to memory controller 106. Memory system 110 is coupled to memory controller 106 by memory bus 114. Memory system 110 stores data and/or instructions for computer system 100 and may comprise any suitable memory, such as single data rate (SDR) or double data rate (DDR) synchronous dynamic random access memory (SDRAM). Graphics controller 120 controls the display of information on a suitable display 122, such as a cathode ray tube (CRT) or liquid crystal display (LCD) for example, coupled to graphics controller 120. Memory controller 106, for one embodiment, interfaces with graphics controller 120 through an accelerated graphics port (AGP). Graphics controller 120, for one embodiment, may alternatively be combined with memory controller 106 to form a single chip.

Memory controller 106 is also coupled to IOC 108 through an interface to provide access to IOC 108. IOC 108 provides an interface to I/O devices or peripheral components for computer system 100. IOC 108 may comprise any suitable interface controllers to provide for any suitable communication link to memory controller 106 and/or to any suitable device or component in communication with IOC 108. IOC 108, for one embodiment, provides suitable arbitration and buffering for each interface.

For one embodiment, IOC 108 provides an interface to one or more suitable integrated drive electronics (IDE) drives 124, such as a hard disk drive (HDD) or compact disc read only memory (CD ROM) drive, to store data and/or instructions and one or more suitable universal serial bus (USB) devices through one or more USB ports 126. IOC 108, for one embodiment, also provides an interface through a super I/O controller 128 to a keyboard 130, a mouse 132, one or more suitable devices, such as a printer for example, through one or more parallel ports 134, one or more suitable devices through one or more serial ports 136, and a floppy disk drive 138. IOC 108, for one embodiment, further provides an interface to one or more suitable peripheral component interconnect (PCI) devices coupled to IOC 108 through one or more PCI slots 140 on a PCI bus, and an interface to one or more suitable industry standard architecture (ISA) devices coupled to IOC 108 by the PCI bus through an ISA bridge 142. ISA bridge 142 interfaces with one or more ISA devices through one or more ISA slots 144 on an ISA bus.

A Memory Controller

Figure 2:
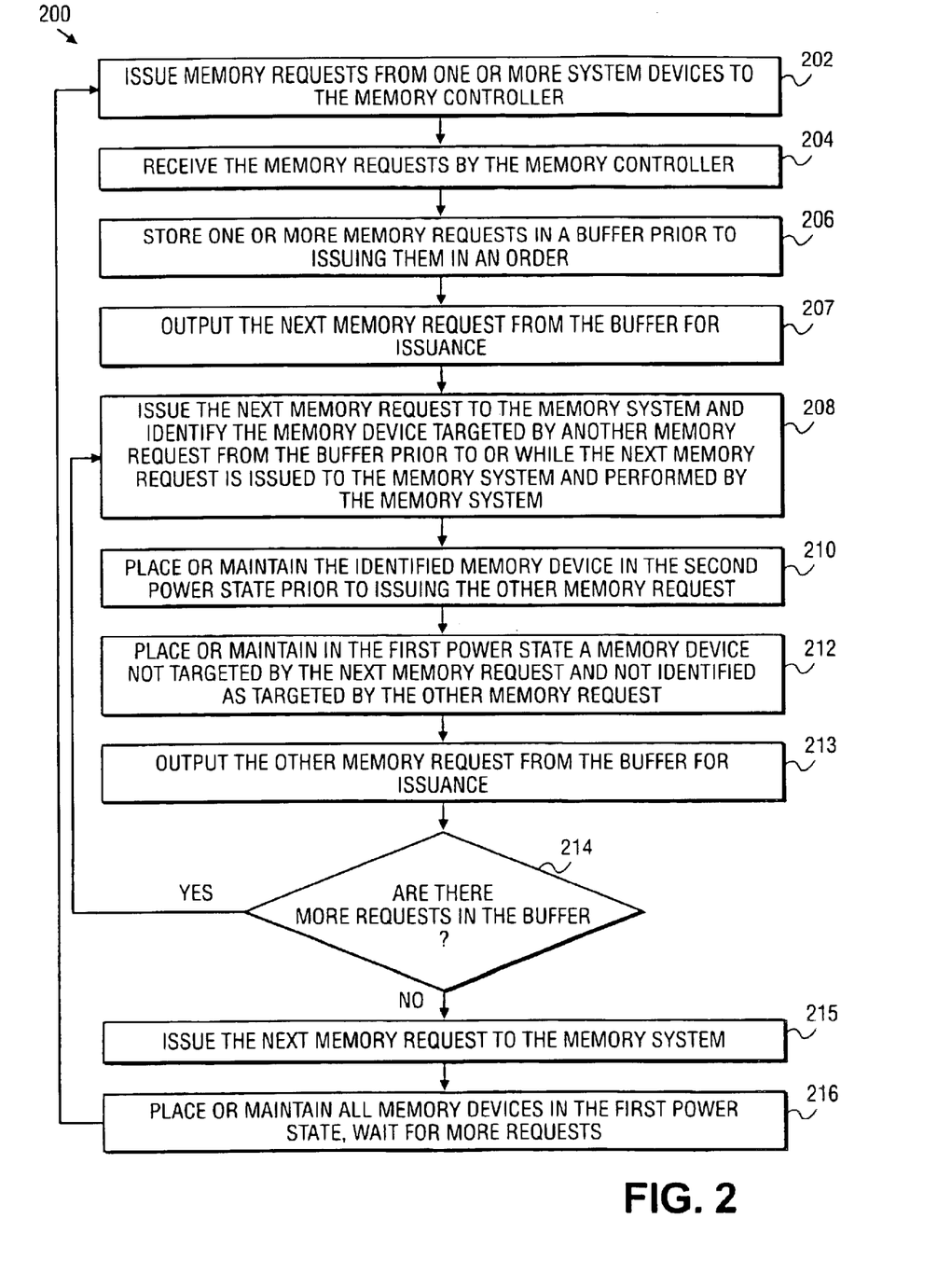
FIG. 2 illustrates, for one embodiment, a flow diagram of memory control with lookahead power management.

The operation of one embodiment of memory control with lookahead power management is illustrated in a flow diagram 200 of FIG. 2. In one embodiment, the operations of flow diagram 200 are performed by memory controller 106, as illustrated in FIG. 3.

Figure 3:
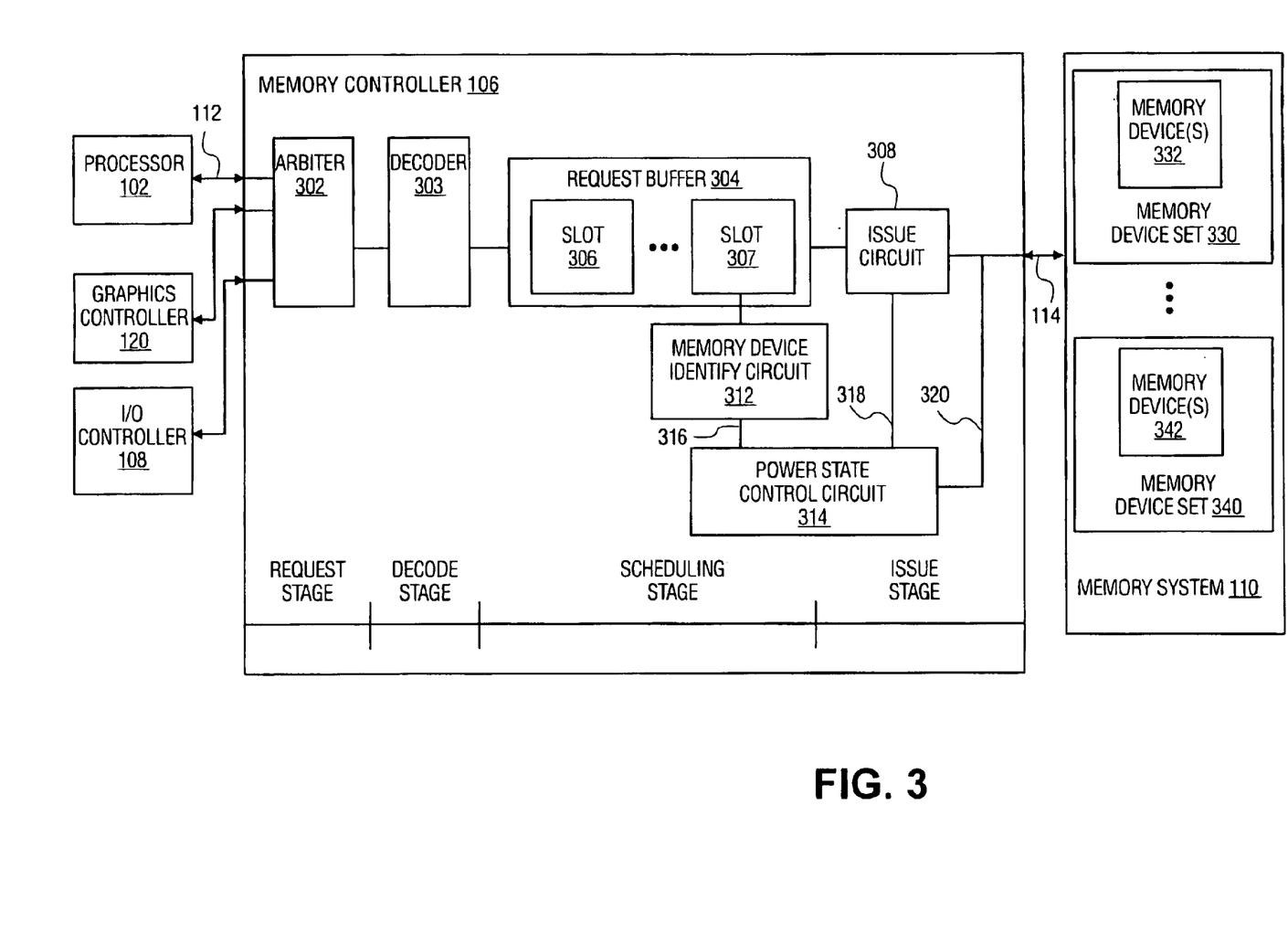
FIG. 3 illustrates, for one embodiment, a memory controller to perform lookahead power management.

As illustrated in FIG. 3, one embodiment of memory controller 106 comprises an arbiter 302, a decoder 303, a request buffer 304, an issue circuit 308, a memory device identify circuit (MDIC) 312, and a power state control circuit (PSCC) 314. Each may comprise any suitable circuitry.

Memory controller 106 functions as an interface to memory system 110 for system devices, such as processor 102, graphics controller 120, and IOC 108. Memory controller 106 executes memory requests in a pipelined manner, which increases the throughput of processing memory requests.

As illustrated, in one embodiment, memory controller 106 receives a memory request with arbiter 302 in a request stage, decodes the memory request with decoder 303 in a decode stage, places the decoded memory request in request buffer 304 in a scheduling stage, and issues the memory request to memory system 110 with issue circuit 308 in an issue stage.

Memory controller 106 is coupled to memory system 110 by memory bus 114. In one embodiment, memory bus 114 comprises address lines, data lines, and control lines. In other embodiments, additional types of bus lines may be provided to support additional memory features.

Memory system 110 comprises one or more memory devices. As illustrated in FIG. 3, for one embodiment, memory system 110 may comprise one or more memory device sets, such as memory device sets 330 and 340, which may each comprise one or more memory devices, such as memory devices 332 and 342, respectively. While only two memory device sets are illustrated, it should be appreciated that more than two memory device sets may be supported by memory controller 106.

For one embodiment, memory system 110 may comprise memory device sets of one or more SDRAM memory devices, commonly referred to as memory rows. Memory bus 114 may comprise a separate clock enable (CKE) line and a separate chip select (CS) line for each memory row, so that each memory device on a memory row shares a common CKE line and a common CS line. Other bus lines, such as data, address, and control lines, may be shared among multiple memory rows. For one embodiment, memory system 110 comprises memory rows of SDRAM devices packaged as dual inline memory modules (DIMMs) of one or more memory rows per DIMM.

Referring now to flow diagram 200 of FIG. 2, in block 202, memory requests are issued from one or more system devices to memory controller 106. For example, a memory request may originate from processor 102, graphics controller 120, or IOC 108. The memory request may target a memory device in memory system 110, for example, to read data from or write data to the targeted memory device. A memory device set or memory row containing a memory device targeted by a memory request may be referred to as targeted by the memory request.

In block 204, memory controller 106 receives the memory requests. Because more than one memory request may be received simultaneously, arbiter 302 determines an order of priority in the request stage before the memory request is passed on to the decode stage.

In one embodiment, arbiter 302 may implement a predetermined order of priority that gives memory requests from graphics controller 120 top priority, while memory requests from the processor 102 have second priority. As a result, if memory requests are received simultaneously from processor 102 and graphics controller 120, the memory request of graphics controller 120 would be processed first. Alternative embodiments may implement other techniques to arbitrate simultaneously received memory requests. In other embodiments, arbiter 302 could be provided as an external device coupled between system devices and memory controller 106. In another embodiment, memory controller 106 may receive memory requests from only one device, such as processor 102, and may not comprise arbiter 302.

Decoder 303 in the decode stage decodes the arbitrated memory requests, which may be of any suitable format. For example, in one embodiment, decoder 303 decodes a memory request to determine the intended operation (e.g., read data or write data) of the memory request, the memory address of the memory request, and, if the memory request is a write request, data to be written to the targeted memory device. Thereafter, the decoded information is passed to the scheduling stage of memory controller 106.

The memory address provided with the memory request is, in part, dependent on the type of memory implemented in the system. For example, in an embodiment where memory system 110 comprises memory rows of SDRAM memory devices, the decoded memory address information may include identification of the memory row containing the memory location targeted by the memory request, an identification of the targeted memory page within the identified memory row, and a storage location within the identified memory row and page.

In another embodiment, memory requests are issued with a virtual address. In such an embodiment, additional circuitry is included to convert a virtual address to a real address prior to decoding the address as described above.

In block 206, one or more memory requests are stored in request buffer 304 in the scheduling stage prior to issuing them in an order. For one embodiment, request buffer 304 comprises one or more slots, such as slots 306 and 307, to store one or more decoded memory requests in a first-in-first-out (FIFO) manner.

In another embodiment, request buffer 304 is located before decoder 303, and stores memory requests that have not been decoded. For such an embodiment, decoder 303 may be located between request buffer 304 and issue circuit 308, so that memory requests are decoded as they are output from request buffer 304.

In block 207, the next memory request is output from request buffer 304 for issuance by issue circuit 308. In block 208, the next memory request is issued to memory system 110 by issue circuit 308 in the issue stage.

In one embodiment, issue circuit 308 provides multiplexing/demultiplexing access to memory bus 114 during issuance of a memory request to memory system 110. As an example, if the memory request is a write request, issue circuit 308 may output address information to memory bus 114, followed by data to be written to memory system 110.

If the memory request is a read request, issue circuit 308 may output address information to memory bus 114, and then receive as input requested data which is output from memory system 110 to memory bus 114. Memory controller 106 then outputs the requested data to the system device that issued the read request. While not illustrated in FIG. 3, memory controller 106 may comprise response circuitry to process a response from memory system 110. Such circuitry is well known in the art.

Memory system 110 may comprise memory devices having at least a first power state and a second power state. The first power state may correspond to a low power state, in which the memory devices are unable to accept memory requests, while the second power state may correspond to a normal operating power state. For one embodiment, a memory device set may be placed into the first power state or the second power state, causing each memory device in the memory device set to be placed into the first power state or second power state, respectively.

Memory devices may also have one or more additional power states that may correspond to an even lower power state than the first power state. Such power states typically require a much greater latency period upon exit than the first power state, and would therefore typically be entered only on a system-wide low power state, such as a suspend operation.

Prior to issuing memory requests to memory system 110, memory controller 106 should ensure a memory device targeted by a memory request is in a normal operating power state and is capable of receiving the memory request. Issue circuit 308 may generate a signal on a bus 318 coupled with PSCC 314 to identify the targeted memory device or the targeted memory device set. For one embodiment, PSCC 314 places the memory device set identified by issue circuit 308 in the normal operating power state prior to issuing the memory request, thereby placing each memory device in the identified memory device set in the normal operating state.

As previously described, in one embodiment, memory system 110 comprises memory rows of one or more SDRAM memory devices that share a common CKE line within a memory device set. PSCC 314 may place SDRAM memory devices within a memory row into a normal operating power state and a low power state by asserting and de-asserting, respectively, a signal on the common CKE line.

Figure 4:
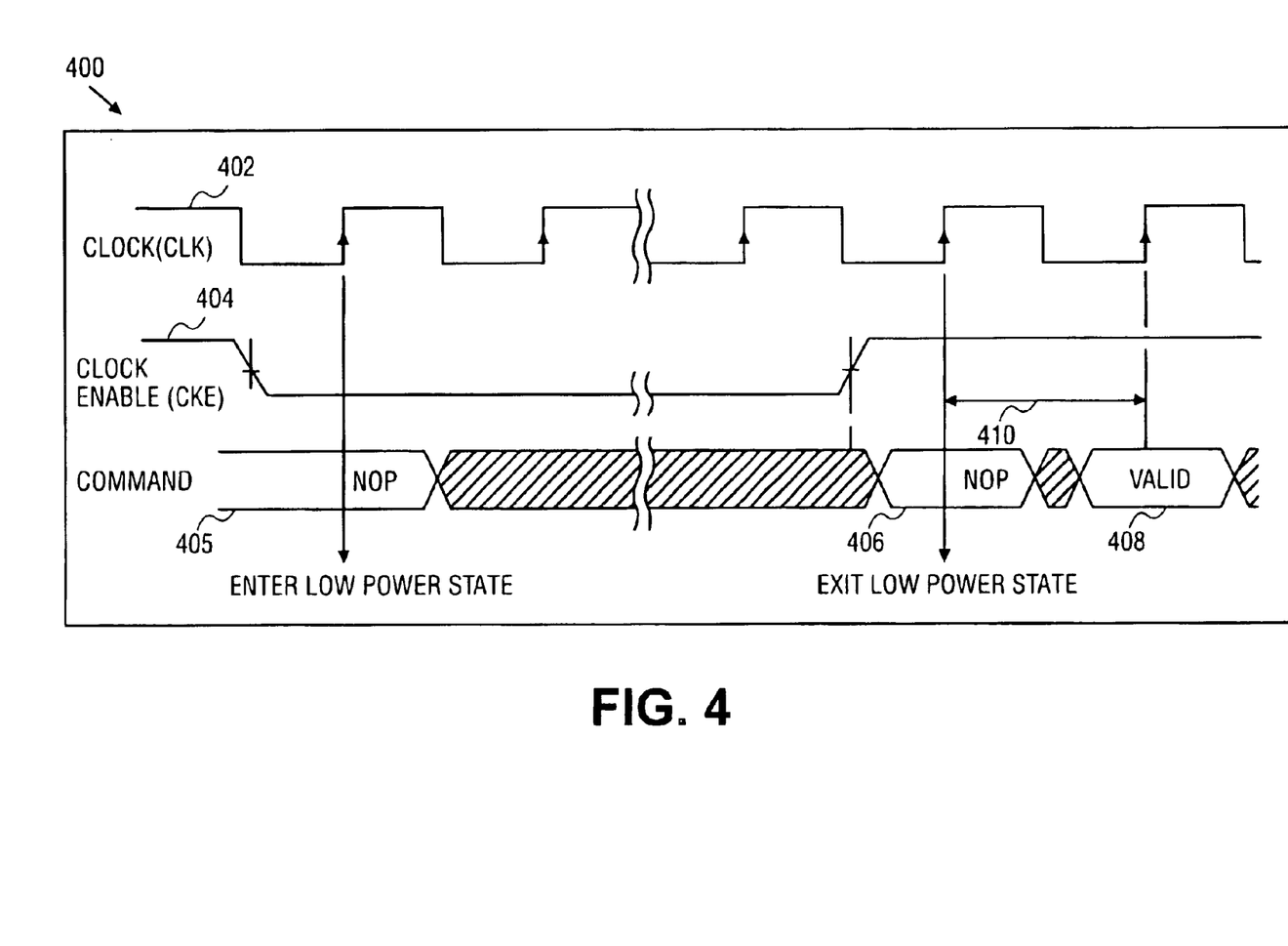
FIG. 4 illustrates a timing diagram of a latency period required by a typical synchronous dynamic random access memory (SDRAM) device after exiting a low power state that is overcome by one embodiment of memory control with lookahead power management.

As previously described, SDRAM devices require a one or more clock cycle latency period after exiting a low power state through CKE signal assertion before a memory request may be issued to the device. Timing diagram 400 of FIG. 4 illustrates a one clock cycle latency period required by one type of SDRAM devices.

Timing diagram 400 comprises timelines for a clock (CLK) signal 402, a clock enable (CKE) signal 404, and command signals 405. The low power state is entered when CKE signal 404 is de-asserted. While in the low power state, CKE signal 404 should remain de-asserted while a stable CLK signal 402 is maintained. The low power state is exited when CKE signal 404 is asserted, in conjunction with a No Operation (NOP) request 406 on the rising edge of CLK signal 402. A valid memory request 408 may be applied only after the one clock period indicated by 410 has expired.

This latency period may be overcome or reduced by identifying a memory device targeted by a memory request in request buffer 304 and placing the identified memory device in a normal power state prior to issuing the memory request. By the time the memory request that targets the memory device issues, the memory device may have been powered up long enough that the latency period will have expired. Therefore, the memory request may issue without delay, increasing memory bandwidth.

Lookahead Power Management

Therefore, in block 208, prior to or while the next memory request is being issued to memory system 110 by issue circuit 308 and performed by memory system 110, MDIC 312 identifies the memory device targeted by another memory request from request buffer 304. MDIC 312 may identify the targeted memory device from the address information of the memory request stored in request buffer 304. For one embodiment, MDIC 312 generates an output signal on a bus 316 coupled to PSCC 314 to identify the memory device set targeted by the other memory request.

In block 210, PSCC 314 places or maintains in the second power state the memory device identified by MDIC 312 as targeted by the other memory request in request buffer 304 prior to issuing the other memory request.

In block 212, PSCC 314 places or maintains in the first power state a memory device not targeted by the next memory request being issued by issue circuit 308, and not identified by MDIC 312 as targeted by the other memory request from request buffer 304. Placing or maintaining memory devices in a low power state when not being accessed helps reduce power consumption.

For one embodiment, bus 316 and bus 318 may each comprise bus lines equal in number to the memory device sets supported by memory controller 106. MDIC 312 may assert a signal on only one of the bus lines of bus 316 to identify the memory device set targeted by a memory request in request buffer 304, while issue circuit 308 may assert a signal on only one of the bus lines of bus 318 to identify the memory device set targeted by the memory request being issued.

Figure 5:
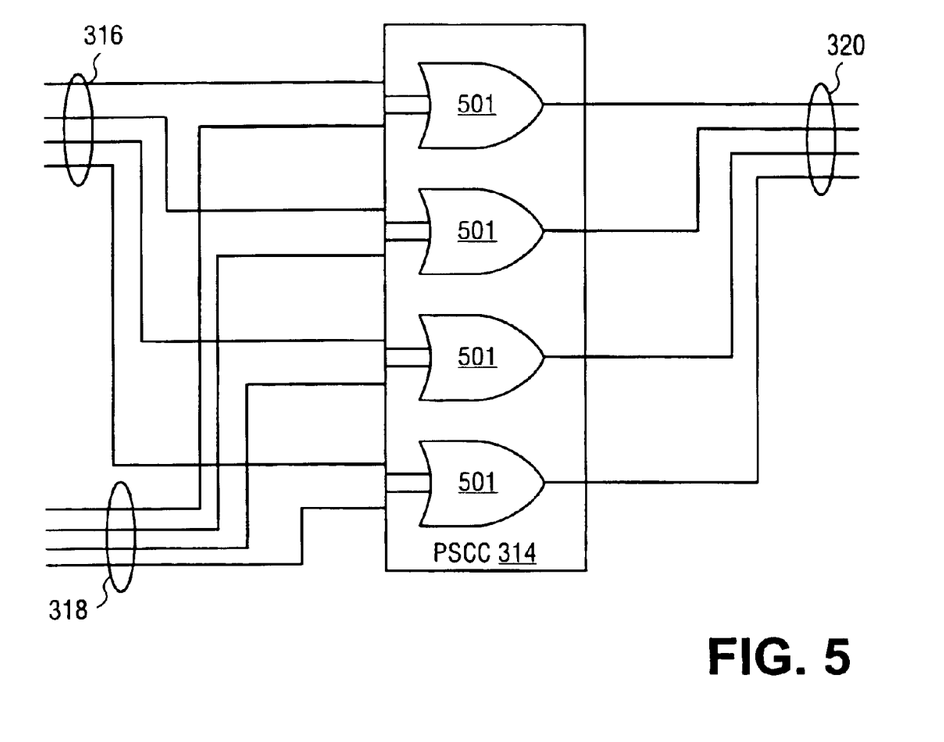
FIG. 5 illustrates one embodiment of a circuit diagram for a power state control circuit.

FIG. 5 illustrates an exemplary circuit of PSCC 314. PSCC 314 comprises an OR circuit 501 for each memory device set supported by memory controller 106. For one embodiment, each OR circuit 501 has one input coupled to one line of bus 316, another input coupled to one line of bus 318, each line corresponding to one memory device set, and an output coupled to a line of bus 320.

For example, if a memory request from request buffer 304 targets the first memory device set, MDIC 312 will assert a signal on bus 316 corresponding the first memory device set. Therefore, the OR circuit 501 corresponding to the first memory device set will assert a signal on bus 320, regardless of the signals generated on bus 318 by issue circuit 308. Similarly, issue circuit 308 will assert one of the signals on bus 318 corresponding to a memory device set targeted by the memory request being issued, and the corresponding OR circuit 501 will assert a signal on bus 320 regardless of the signals generated on bus 316 by MDIC 312.

However, if a memory device set is not identified as targeted by MDIC 312 or issue circuit 308, as indicated by signals on bus 316 or 318, respectively, the OR circuit 501 corresponding to the memory device set will de-assert a signal on bus 320.

For embodiments where memory device sets comprise SDRAM devices, the lines of bus 320 may be coupled to CKE lines for the memory device sets to accomplish the operation of block 212.

In block 213, the other memory request is output from request buffer 304 for issuance. As illustrated in block 214, while there are memory requests in request buffer 304, the operations of blocks 208–213 will be repeated.

Finally, as illustrated in blocks 215 and 216, when request buffer 304 is empty, the last memory request is issued to memory system 110 and all memory device sets are maintained in the first power state, which may help reduce power consumption.

While the operations of flow diagram 200 are illustrated in a sequential manner, it should be appreciated that some of the operations may be performed in parallel. As an example, the operation of block 210 may place the identified memory device in the second power state while the operation of block 212 places a different memory device in the first power state, in a simultaneous manner.

Clock Enable Assertion for SDRAM Devices

Figure 6:
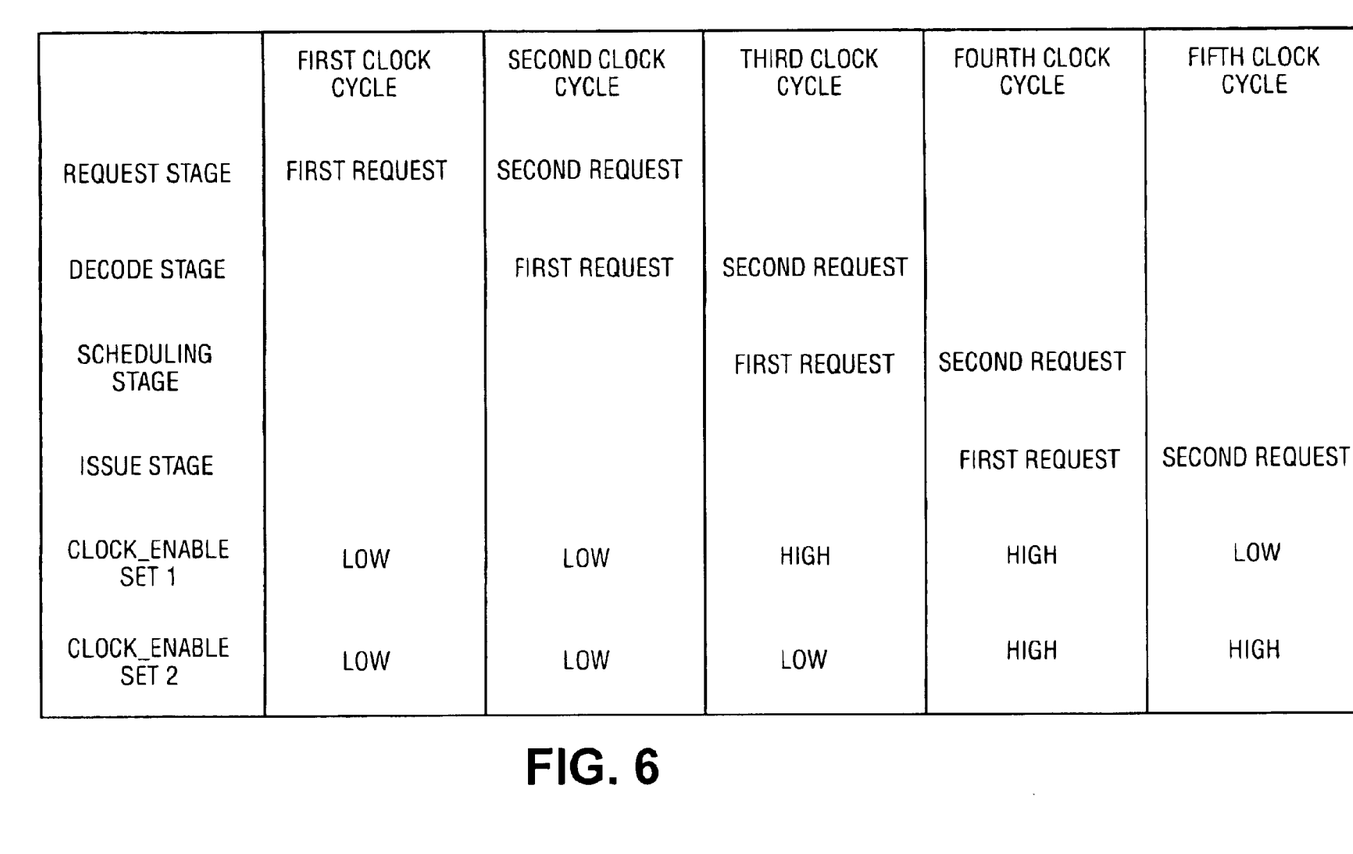
FIG. 6 illustrates the flow of memory requests in an exemplary pipelined memory controller to perform lookahead power management.

FIG. 6 illustrates a timing diagram of CKE signal assertion, according to one embodiment operating in accordance with the flow diagram 200. While the example assumes request buffer 304 holds only one memory request, and that only two memory device sets of SDRAM devices are supported for illustrative purposes, it should be appreciated that memory controller 106 is not so limited.

In the first clock cycle, a first memory request targeting a memory device in a first memory device set enters the request stage.

In the second clock cycle, the first memory request enters the decode stage as a second memory request targeting a memory device in a second memory device set enters the request stage.

In the third clock cycle, the first memory request enters the scheduling stage as the second memory request enters the decode stage. The CKE signal for the first memory device set is asserted in this third clock cycle.

In the fourth clock cycle, the first memory request enters the issue stage. Because one clock period has passed since the CKE signal for the first memory device set was asserted, the first memory request can be issued. As the second memory request enters the scheduling stage in this same clock cycle, the CKE signal for the second memory device set is asserted.

In the fifth clock cycle, the second memory request enters the issue stage. Because one clock period has passed since the CKE signal for the second memory devices set was asserted, the second memory request issues. Because the second memory request does not target the first memory device set, and there are no other memory requests in request buffer 304, the CKE signal for the first memory device set is de-asserted in the fifth clock cycle. It should be noted that CKE de-assertion does not occur until the memory request has been completed.

Without placing the memory device sets targeted by the memory requests in the normal operating state ahead of time, memory controller 106 would have incurred a two clock cycle latency penalty. Specifically, if the CKE signal for the first memory device set had not been asserted in the third clock cycle, the memory devices in the first memory device set would not have been ready to accept the first memory request in the fourth clock cycle, and memory controller 106 would have had to wait one clock cycle before issuing the first memory request. Similarly, if the CKE signal for the second memory device set had not been asserted in the fourth clock cycle, the memory devices in the second memory device set would not have been ready to accept the second memory request in the fifth clock cycle, and memory controller 106 would have had to wait another clock cycle before issuing the second memory request.

Hence, for the memory sequence illustrated in FIG. 6, two clock cycle latency periods are eliminated by lookahead power management. The exact performance gains realized by utilizing lookahead power management will depend on the exact sequence of memory requests. However, as memory devices are powered down more aggressively, the cumulative effect of latency periods is greater, and the performance gains realized by lookahead power management increase.

Multiple Lookahead to Overcome Longer Latency

While the latency period associated with exiting from low power states caused by CKE de-assertion, in the example illustrated in FIG. 6, is one clock cycle, other SDRAM devices may require a latency period of more than one clock cycle. Other types of memory devices may also have a latency period of more than one clock cycle associated with exiting a low power state. For instance, Rambus® DRAM devices have a longer latency period when exiting from a low power state referred to as a Nap state.

Figure 7:
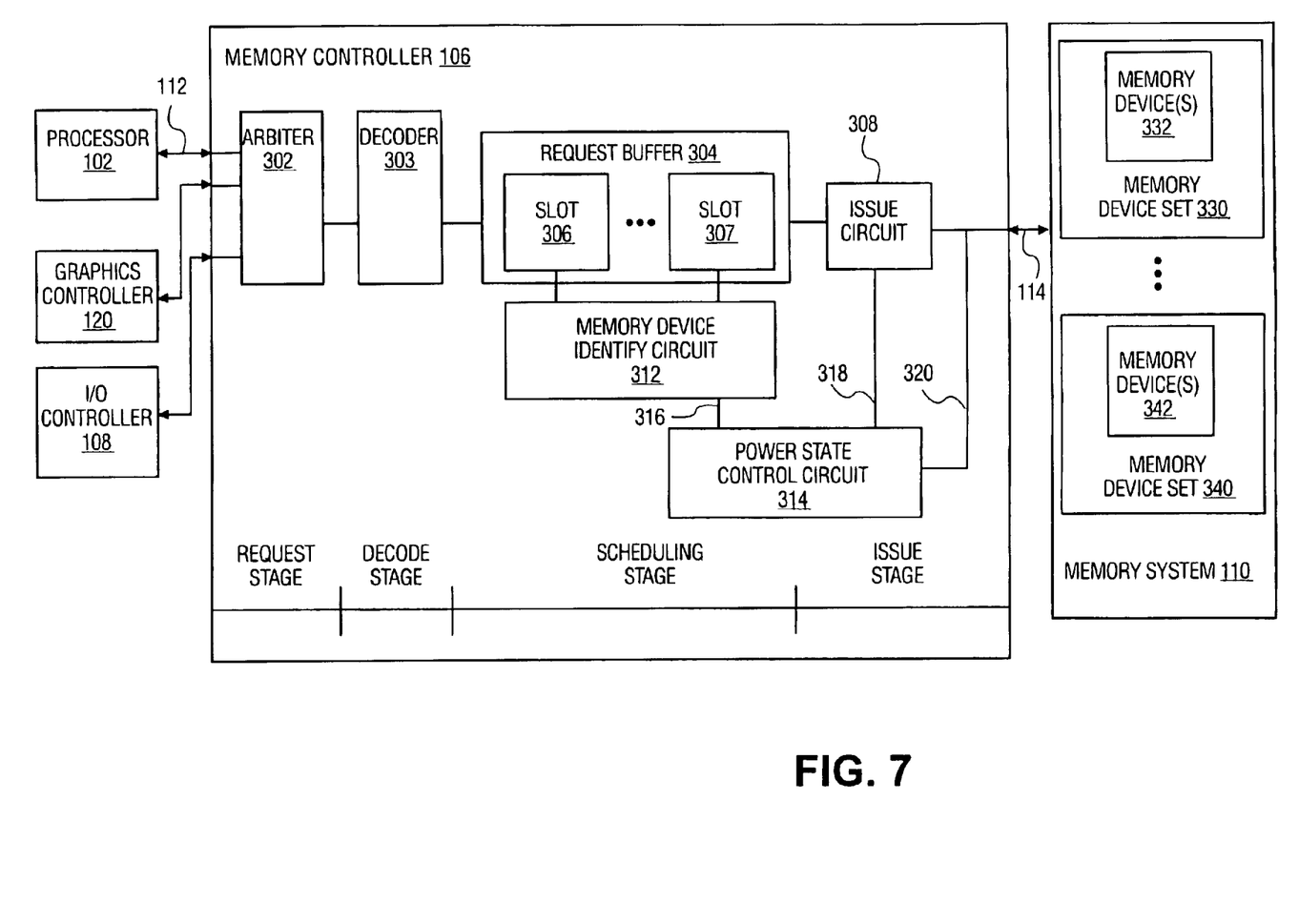
FIG. 7 illustrates, for another embodiment, a memory controller to perform lookahead power management.

Another embodiment of memory controller 106, illustrated in FIG. 7, can overcome or reduce latency periods of more than one clock cycle by looking ahead at the memory devices targeted by more than one memory request in request buffer 304. This allows memory controller 106 to change the power state of a targeted memory device more than one clock cycle before a memory request that targets the memory device issues.

As illustrated, MDIC 312 may identify the memory devices targeted by more than one memory request stored in slots 306 through 307 of request buffer 304 prior to or while issuing a memory request by issue circuit 308 to memory system 110. PSCC 314 comprises suitable circuitry to place the identified memory devices in a first or second power state according to the type of memory devices supported. As an example, PSCC 314 may comprise suitable circuitry to issue a Nap-exit sequence to a Rambus® DRAM device.

Similarly, the exact number of memory requests in request buffer 304 for which the targeted memory devices are identified by MDIC 312 will depend on the latency period of the memory devices supported, to ensure targeted memory devices are powered up sufficiently prior to issuing the memory requests that target the memory devices. Accordingly, request buffer 304 should be large enough to store the number of memory requests required to overcome the latency period associated with the type of memory devices supported.

Other embodiments of the present invention may include memory controllers with different stages than those illustrated in FIG. 3. For instance, one embodiment may include a pre-decode stage with circuitry to decode the set of memory devices targeted by a memory request in the pre-decode stage. Another embodiment may lack a decode stage so that request buffer 304 stores memory requests that have not been decoded, while issue circuit 308 may comprise circuitry to decode the memory requests prior to issuance. In such an embodiment, MDIC 312 may comprise suitable circuitry to identify a targeted memory device from a memory request in request buffer 304 that has not been decoded.

Memory controller 106 may also be used in a variety of battery-powered devices, from a portable computer to a handheld device such as a personal digital assistant (PDA). In such devices, memory controller 106 may help extend battery life by placing memory devices into a low power state when they are not being accessed, while increasing memory bandwidth by performing lookahead power management.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
    storing one or more memory requests in a request buffer, each memory request targeting a memory device in a memory system having one or more memory devices, each memory device having a first power state and a second power state;
    issuing each memory request in an order from the request buffer to the memory system;
    identifying the memory device targeted by one memory request from the request buffer prior to or while another memory request ahead of the one memory request is issued to the memory system and performed by the memory system;
    placing or maintaining the identified memory device in the second power state prior to issuing the one memory request to the memory system; and
    placing or maintaining in the first power state a memory device not targeted by other memory request and not identified as the memory device targeted by the one memory request.

2. The method of claim 1, wherein:
    the memory system has one or more sets of one or more memory devices; and
    the method comprises placing or maintaining each memory device in a set containing the identified memory device in the second power state.

3. The method of claim 1, wherein the placing or maintaining the identified memory device in the second power state comprises asserting a clock enable signal to the identified memory device.

4. The method of claim 1, comprising:
    identifying the memory device targeted by more than one memory request from the request buffer prior to or while another memory request ahead of the more than one memory request is issued to the memory system and performed by the memory system; and
    placing or maintaining each identified memory device in the second power state prior to issuing the more than one memory request to the memory system.

5. The method of claim 4, comprising placing or maintaining in the first power state a memory device not targeted by the other memory request and not identified as targeted by the more than one memory request.

6. An apparatus comprising:
    a request buffer to store one or more memory requests, each memory request targeting a memory device in a memory system having one or more memory devices, each memory device having a first power state and a second power state;
    an issue circuit to issue each memory request in an order from the request buffer to the memory system;
    a memory device identify circuit to identify the memory device targeted by one memory request from the request buffer prior to or while another memory request ahead of the one memory request is issued to the memory system by the issue circuit and performed by the memory system; and
    a power state control circuit to place or maintain the identified memory device in the second power state prior to issuance of the one memory request to the memory system by the issue circuit, the power state control circuit to place or maintain in the first power state a memory device not targeted by other memory request and not identified as the memory device targeted by the one memory request.

7. The apparatus of claim 6, wherein the memory system has one or more sets of one or more memory devices; and
    wherein the power state control circuit places or maintains each memory device in a set containing the identified memory device in the second power state.

8. The apparatus of claim 6, wherein the power state control circuit asserts a clock enable signal to the identified memory device.

9. The apparatus of claim 6, wherein the memory device identify circuit identifies the memory device targeted by more than one memory request from the request buffer prior to or while the other memory request is issued to the memory system by the issue circuit and performed by the memory system; and
    wherein the power state control circuit places or maintains each identified memory device in the second power state prior to issuance of the more than one memory request to the memory system by the issue circuit.

10. The apparatus of claim 9, wherein the power state control circuit places or maintains in the first power state a memory device not targeted by the other memory request and not identified by the memory device identify circuit.

11. The apparatus of claim 9, wherein the power state control circuit issues a Nap-exit sequence to one or more Rambus dynamic random access memory devices.

12. A system comprising:
(a) a memory system having one or more memory devices, each memory device having a first power state and a second power state;
(b) a processor to issue memory requests, each memory request targeting a memory device in the memory system; and
(c) a memory controller to receive memory requests issued by the processor, comprising:
  (i) a request buffer to store one or more memory requests,
  (ii) an issue circuit to issue each memory request from the request buffer to the memory system,
  (iii) a memory device identify circuit to identify the memory device targeted by one memory request from the request buffer prior to or while another memory request ahead of the one memory request is issued to the memory system by the issue circuit and performed by the memory system, and
  (iv) a power state control circuit to place or maintain the identified memory device in the second power state prior to issuance of the one memory request to the memory system by the issue circuit, the power state control circuit to place or maintain in the first power state a memory device not targeted by other memory request and not identified as the memory device targeted by the one memory request.

13. The system of claim 12, wherein the memory system has one or more sets of one or more memory devices; and
wherein the power state control circuit places or maintains each memory device in a set containing the identified memory device in the second power state.

14. The system of claim 12, wherein the power state control circuit asserts a clock enable signal to the identified memory device.

15. The system of claim 12, wherein the memory device identify circuit identifies the memory device targeted by more than one memory request from the request buffer prior to or while the other memory request is issued to the memory system by the issue circuit and performed by the memory system; and
wherein the power state control circuit places or maintains each identified memory device in the second power state prior to issuance of the more than one memory request to the memory system by the issue circuit.

16. The system of claim 15, wherein the power state control circuit places or maintains in the first power state a memory device not targeted by the other memory request and not identified by the memory device identify circuit.

17. The system of claim 12, wherein the memory devices are synchronous dynamic random access memory devices.

18. The system of claim 12, wherein the memory devices are double data rate synchronous dynamic random access memory devices.

19. The system of claim 15, wherein the memory devices are Rambus dynamic random access memory devices.

20. The system of claim 12, wherein the memory system has one or more sets of one or more synchronous dynamic random access memory devices, wherein each set is packaged as a dual inline memory module; and
wherein the power state control circuit places or maintains each memory device in a set containing the identified memory device in the second power state.

* * * * *